Jan. 28, 1958     R. B. PETTIBONE     2,821,140

POWER TRANSMISSION

Filed Jan. 28, 1954

INVENTOR.
RAYMOND B. PETTIBONE
BY
Ralph L. Tweedale
ATTORNEY

United States Patent Office 2,821,140
Patented Jan. 28, 1958

2,821,140

POWER TRANSMISSION

Raymond B. Pettibone, Detroit, Mich., assignor to Vickers Incorporated, Detroit, Mich., a corporation of Michigan Application January 28, 1954, Serial No. 406,633

4 Claims. (Cl. 103—42)

This invention relates to power transmissions, and is particularly applicable to those of the type comprising two or more fluid pressure energy translating devices, one of which may function as a pump and another as a fluid motor.

This invention relates to pumps and more particularly to the type of unit known as a "power pack" comprising a pump, fluid reservoir, and usually a valve or valves integrated into a compact unit. These power pack units have had wide acceptance in the automotive and agricultural fields due to their compactness and the ease of installation. Simplicity, ruggedness of construction, low cost, long life, and efficient operation are of paramount importance in the design of such a unit. With the increasing emphasis being put on passenger car applications of hydraulic power, for example: hydraulic steering boosters and hydraulic window lifts, quietness of operation has become an additionally important criterion of such units. One of the most frequent causes of pump noise results from inability of atmospheric pressure to completely fill the pump inlet zones with fluid. This phenomenon is termed cavitation, and occurs primarily during high-speed operation. To avoid cavitation the prior art has utilized various schemes to increase the pump inlet pressure or, as it is commonly expressed, to "supercharge" the pump inlet.

One widely used scheme for supercharging the inlet of a pump utilizes the velocity effect of fluid bypassed by a spillover type flow control valve. Since fluid requirements of motor vehicle accessories such as hydraulic steering boosters may be as high when the engine is idling as they are when it is at high speed, a fluid pump to supply those accessories must have a substantial delivery rate while the engine idles. Further, since the speed of a motor vehicle engine varies in the ratio of approximately 1 to 10 from idle to full speed, the speed of a pump coupled directly to the engine will vary in the same ratio. The result is excessive fluid delivery rates with consequent power loss during highway operation of the vehicle. A spillover type flow control valve responsive to the pump delivery rate has been found an effective solution to this problem.

It has been previously proposed to pass the fluid spilled over by such flow control through a relatively constricted passage, or venturi-like throat, to produce a high-speed jet, and to utilize the velocity effect of that jet to increase the pressure in the inlet zones of the pump. One of the disadvantages of such prior units has been the fact that once the spillover flow control valve opens, the amount of supercharge obtained is dependent almost completely on the volume of fluid being bypassed. This variance in supercharge pressure is undesirable. Too little supercharge results in cavitation and noise, whereas too much supercharge causes excessive leakage at the pump shaft seals and excessive circulation in the reservoir bleed loop, with consequent turbulence and aeration of the fluid in the reservoir. If the venturi throat is so proportioned as to avoid oversupercharging, insufficient supercharge may result at the lower speeds.

It is an object of this invention to provide a fluid circulating system for use in supercharging a pump inlet which avoids the above mentioned disadvantages of prior devices.

More particularly, it is an object of this invention to provide improved means for increasing the inlet pressure of pumping mechanism which utilizes fluid bypassed by a spillover type flow control valve and which is of simple low-cost construction.

A further important object is to provide a system of the type described which will, as contrasted to prior devices, maintain relatively constant supercharge pressure over a wide range of pump speeds.

It is also an object of this invention to provide a fluid circulating system of the type described in which aeration and turbulence of the circulating fluid is minimized.

Further objects and advantages of the present invention will be apparent from the following description, reference being had to the accompanying drawing wherein a preferred form of the present invention is clearly shown.

Figure 1:
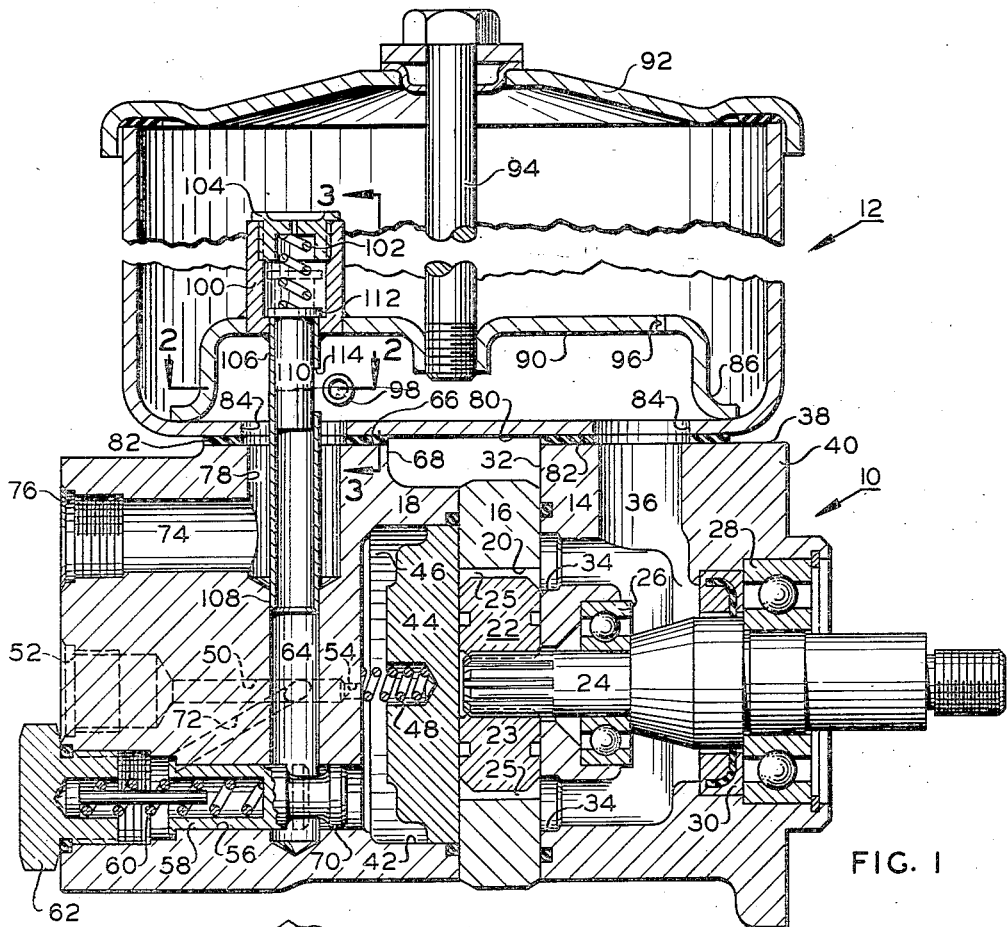
Figure 1 is a longitudinal sectional view of a device embodying the present invention.
Figure 2:
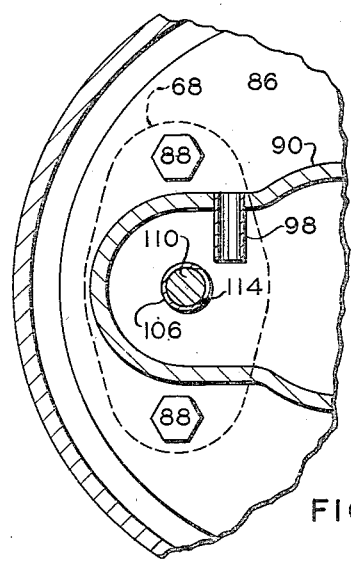
Figure 2 is a partial section taken on line 2—2 of Figure 1.

Referring now to Figure 1, there is shown a pump generally designated 10 and a reservoir generally designated 12. The pump 10 includes a body portion 14, a ring 16, and a head 18 arranged in a sandwich relation and secured together by a plurality of bolts, not shown, which extend through the head and ring and into threaded holes in the body.

The ring 16 provides a stator element having a pumping chamber 20 therein. Rotary pumping mechanism, generally designated 22, includes a rotor 23 and vanes 25 and is supported in the pumping chamber 20 by a drive shaft 24. Shaft 24 is rotatably carried by bearings 26 and 28 in the body 14. A conventional shaft seal 30 prevents leakage of fluid from the body 14 at the point of emergence therefrom of the shaft 24. The body 14 includes a flat plane face 32 against which the ring 16 and the pumping mechanism 22 abut, and has therein a pair of inlet ports 34 which communicate with the pumping chamber 20. The inlet ports 34 communicate with a branched passage 36 which extends to the face 38 of a flange 40 on the body 14.

The head member 18 has a bore 42 therein in which is positioned a pressure plate 44. The pressure plate 44 coacts with the bore 42 to form a pressure chamber 46. High pressure delivery ports, not shown, extend completely through the pressure plate 44 from pressure chamber 46 to the pump chamber 20. A spring 48 biases the pressure plate 44 into axial abutment with the ring 16 and the rotary pumping mechanism 22 in the pumping chamber 20. The pump mechanism per se forms no part of the present invention and consequently has been described very briefly.

A delivery passage 50 extends from the pressure chamber 46 to a threaded external connection port 52. The delivery passage 50 has therein a restriction 54 immediately adjacent the pressure chamber 46. A valve bore 56 extends from the end of the head 18 into the pressure chamber 46. A flow controlling valve spool 58 is slidably positioned in the valve bore 56 and is biased to its normal position by a spring 60. Spring 60 is retained by a plug 62 which closes the outer end of the bore 56. A transverse passage 64 extends downwardly from the face 66 of a flange 68 on the head 18 to intersect the valve bore 56. The normal spring biased position of valve spool 58 is such that the land 70 of the spool 58 isolates the pressure chamber 46 from the transverse passage 64.

An angular drilled passage 72 extends from the delivery passage 50, at a point downstream from the orifice 54, to communicate with the outer end of the valve bore 56 so as to conduct pressure to left end of the valve spool 58. The right hand end of the valve spool 58 is directly exposed to the pressure in the pressure chamber 46. The valve spool 58 thus has equal opposed areas exposed to pressure upstream and downstream from the orifice 54. When delivery from the pumping mechanism 22 exceeds a predetermined rate, as established by the load of spring 60, the pressure drop across orifice 54 acting on the opposed areas of spool 58 will shift the spool to the left to divert fluid from the pressure chamber 46 to the transverse bore 64. Should the pump speed increase beyond this point the valve spool 58 will continue to shift to the left diverting an increasingly larger portion of the pump output. At all speeds above the cracking point of valve 58, the valve will tend to maintain the pressure drop through orifice 54 constant and thus maintain the flow rate therethrough constant. It can be seen from the foregoing that there is a wide variance in the flow rate of the diverted fluid.

The head 18 includes a passage 74 which terminates in a threaded external connection port 76. The passage 74 intersects the stepped transverse bore 64 in an enlarged portion 78.

The tank 12 includes a flat, bottom portion 80 which abuts a pair of gaskets 82 which are positioned on the flanges 40 and 68 of the body 14 and the head 18, respectively. A pair of holes 84 in the tank bottom coincide with similar holes in the gaskets 82 and overlie the transverse passage 64 and the branched passage 36 in the flanges 68 and 40 respectively. The tank includes a false bottom 86 which is secured to the actual bottom of the tank 80 by the same screws 88 which secure the tank to the head 18 into body 14. A substantially U shaped channel 90 is stamped in the false bottom 86 and forms a conduit connecting the transverse bore 64 and the branched passage 36 in substantially closed communication. The cover 92 of the tank is retained in place by a cover screw 94 which engages threads in the U shaped channel 90. A small bleed hole 96 extends through the channel 90 to establish restricted communication between the tank interior and the interior of the channel 90 for a purpose to be later described. Additional communication between the interior of the tank and channel 90 is established by a tube 98 which extends through the side of the channel.

In a normal installation, the ports 52 and 76 would be connected, respectively, to the inlet and outlet of a fluid motor. High pressure fluid from the pump thus passes through the delivery passage 50 and low pressure fluid returning from the motor to the pump inlet passes through a return passage comprising: passage 74, the enlarged portion 78 of passage 64, channel 90, and the branched passage 36.

Figure 3:
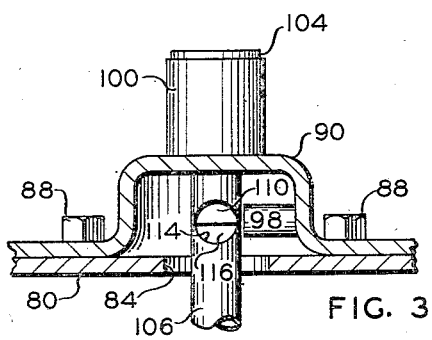
Figure 3 is a partial section taken on line 3—3 of Figure 1.

Welded to the channel 90 is a cylindrical spring housing 100 having a spring 102 retained therein by a vented, threaded plug 104. Welded to the cylindrical sleeve 100 is a tube 106 which extends through the channel 90 and the enlarged portion 78 of the transverse bore 64 to snugly engage the smaller diameter of bore 64 in fluid sealing engagement at 108. The tube 106 has slidably positioned therein a poppet valve 110. Valve 110 has a flange 112 which engages a shoulder in the cylindrical sleeve 100 to establish the spring biased normal position of the valve. The tube 106 has an opening 114 extending through one side thereof, proximate the tube 98. It can be clearly seen that fluid diverted by valve 58, from the pressure chamber 46 into the transverse passage 64, must lift the poppet 110 and uncover the opening 114. There is thus formed a variable restriction or orifice 116 through which the entire flow of fluid diverted by valve 58 must pass. The orifice 116 can be clearly seen in Figure 3, which figure illustrates the valve 110 in the partially opened position.

It can be seen that the load of spring 102 will establish the pressure of the by-passed fluid inside tube 106. The spring 102 is preferably selected to have a low rate so the pressure in tube 106 is maintained relatively constant throughout the full range of movement of valve 110. Thus, despite variations in the rate of flow of fluid by-passed by valve 58 into passage 64, the pressure across orifice 116 will remain substantially constant. Since the velocity of fluid flow through an orifice is primarily dependent on the pressure drop therethrough the velocity of discharge through the orifice 116 will remain substantially constant even though the volume may vary greatly. The jet produced by flow through orifice 116 is directed longitudinally of channel 90 and across the inner end of tube 98 which, as heretofore noted, communicates with the supply of fluid in the reservoir. In accordance with familiar physical laws, the high velocity of the jet crossing the end of tube 98 will be accompanied by a relatively low static pressure. Fluid from the reservoir will thus be induced to enter the jet and will be entrained therein. The fluid taken from the reservoir in this manner serves to replenish the leakage and other losses in the system. In the relative quiescence of channel 90 the velocity energy of the jet is converted to static pressure which supercharges the inlet zones of the pumping mechanism.

As was heretofore noted, the small drilled passage 96 extends through the channel 90 to establish restricted communication between the interior of channel 90 and the fluid in the reservoir 12. During non-supercharged operation, the passage 96 acts in conjunction with tube 98 to conduct fluid from the reservoir to the interior of channel 90 to replenish leakage losses in the system. When valve 58 opens to divert fluid from the pressure chamber 46, the poppet 110 is opened and directs a jet longitudinally into channel 90 through the orifice 116. As previously described, pressure in the channel 90 is increased. Flow through passage 96 will thus reverse and fluid is circulated from the interior of channel 90 to the reservoir 12. The fluid thus diverted through the passage 96 is cleaned, cooled, and deaerated in the reservoir 12, and fresh, replacement fluid enters channel 90 through the tube 98.

In operation, assuming that the shaft 24 of pump 10 is driven at increasing speed by a prime mover, not shown, the entire pump output will initially pass through the delivery passage 50. During this phase of operation, the pressure in channel 90 will be less than atmospheric and circulation from the reservoir to channel 90 may take place through both tube 98 and passage 96, conjointly.

As the pump speed continues to increase, a point will be reached where the pressure drop across the orifice 54 acting on valve spool 58 will overcome the spring 60, causing valve 58 to move to the left. The land 70 will open communication between pressure chamber 46 and the transverse bore 64. Fluid diverted to the bore 64 will pass through the tube 106 and build up sufficient pressure to raise poppet 110 which will move across the opening 114 to create the orifice 116. Fluid will be discharged through the orifice 116 and across the end of tube 98 by the pressure built up in tube 106. The jet thus produced is utilized to replenish and supercharge the pump inlet zones as heretofore described.

Further increases in pump speed result in an increased flow rate of diverted fluid through the orifice 116. Since, however, the orifice 116 automatically adjusts its size to maintain constant pressure downstream thereof, the velocity therethrough remains substantially constant. Since a wide variance in the velocity of the jet utilized for supercharging is avoided, the supercharge pressure at the inlet zones is maintained relatively constant.

This invention has provided a system utilizing fluid diverted by a flow control valve for supercharging the inlet zones of a pumping mechanism which maintains a relatively constant supercharge pressure over a wide range of flow rates of the diverted fluid. By thus avoiding excessive supercharge pressures, excessive circulation through the reservoir bleed loop is avoided, as are the accompanying problems of aeration and turbulence in the reservoir. Further, longer shaft seal life and lower leakage are direct results of practice of this invention.

These objects have been accomplished with a structure that has low original cost and provides long and trouble free service life.

While the form of embodiment of the invention as herein disclosed constitutes a preferred form, it is to be understood that other forms might be adopted, all coming within the scope of the claims which follow.

What is claimed is as follows:

1. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone; valve means responsive to flow in said delivery passage controlling flow in said by-pass passage; auxiliary pressure responsive valve means in said by-pass passage for providing a variable restriction to flow therein; a fluid reservoir; and fluid passage means extending from said reservoir to a point proximate said variable restriction, whereby the velocity effect of fluid passing through the restriction is utilized to supercharge the inlet zone.

2. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone, said by-pass passage including a part of said return passage; valve means responsive to flow in said delivery passage controling flow in said by-pass passage; auxiliary pressure responsive valve means in said by-pass passage for providing a variable restriction to flow therein; a fluid reservoir; and fluid passage means extending from said reservoir to a point proximate said variable restriction, whereby the velocity effect of fluid passing through the restriction is utilized to supercharge the inlet zone.

3. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone; valve means responsive to flow in said delivery passage controlling flow in said by-pass passage; a poppet type valve in said by-pass passage shiftable in response to flow in said passage to provide a variable restriction to flow therein; a fluid reservoir; and fluid passage means extending from said reservoir to a point proximate said variable restriction, whereby the velocity effect of fluid passing through the restriction is utilized to supercharge the inlet zone.

4. A fluid distributing system for use with fluid pumping mechanism having inlet and outlet zones, comprising: means forming a delivery passage extending from said outlet zone; means forming a return passage extending to said inlet zone; means forming a by-pass passage extending from said outlet zone to said inlet zone; valve means responsive to flow in said delivery passage controlling flow in said by-pass passage; means forming a valve bore in said by-pass passage; a lateral port in said bore; pressure responsive valve means in said bore normally closing said port but shiftable to open said port and provide a variable restriction to flow; a fluid reservoir; and fluid passage means extending from said reservoir to a point proximate said variable restriction, whereby the velocity effect of fluid passing through the restriction is utilized to supercharge the inlet zone.

References Cited in the file of this patent

UNITED STATES PATENTS

| | | |
|---|---|---|
| 2,251,664 | Davis | Aug. 5, 1941 |
| 2,325,931 | Avigdor | Aug. 3, 1943 |
| 2,363,528 | Hulman et al. | Nov. 28, 1944 |
| 2,385,513 | Helvern | Sept. 25, 1945 |
| 2,642,148 | Grise | June 16, 1953 |
| 2,683,418 | Smith | July 13, 1954 |

FOREIGN PATENTS

| | | |
|---|---|---|
| 559,108 | Great Britain | Feb. 4, 1944 |